United States Patent
Turlington et al.

(10) Patent No.: US 9,191,269 B2
(45) Date of Patent: Nov. 17, 2015

(54) METHOD AND SYSTEM FOR PROVIDING LATENCY DETECTION BASED ON AUTOMATED LATENCY MEASUREMENTS OF COMMUNICATION NETWORK PATHS

(75) Inventors: Matthew William Turlington, Richardson, TX (US); Christopher Nicholas Delregno, Rowlett, TX (US); Scott R. Kotrla, Wylie, TX (US); Michael U. Bencheck, Richardson, TX (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 393 days.

(21) Appl. No.: 13/605,816

(22) Filed: Sep. 6, 2012

(65) Prior Publication Data

US 2014/0068106 A1    Mar. 6, 2014

(51) Int. Cl.
  *G06F 15/173* (2006.01)
  *H04L 12/24* (2006.01)
  *H04L 12/54* (2013.01)
  *H04L 12/26* (2006.01)

(52) U.S. Cl.
  CPC ........ *H04L 41/0659* (2013.01); *H04L 12/5691* (2013.01); *H04L 43/0852* (2013.01)

(58) Field of Classification Search
  CPC ............ H04L 43/0852; H04L 12/5691; H04L 29/06176; H04L 41/0659
  USPC .............................. 709/238, 241; 710/38, 316
  See application file for complete search history.

(56) References Cited

U.S. PATENT DOCUMENTS

| | | | |
|---|---|---|---|
| 7,133,891 B1* | 11/2006 | Uceda-Sosa et al. ......... | 709/203 |
| 2004/0218536 A1* | 11/2004 | Yasukawa et al. ............. | 370/238 |
| 2006/0239281 A1* | 10/2006 | Sethi et al. .................... | 370/401 |
| 2009/0276570 A1* | 11/2009 | Cheng et al. .................. | 711/115 |
| 2010/0061264 A1* | 3/2010 | Campbell et al. ............. | 370/253 |
| 2010/0077141 A1* | 3/2010 | Achler .......................... | 711/108 |
| 2011/0058472 A1* | 3/2011 | Owens et al. ................. | 370/228 |
| 2012/0075999 A1* | 3/2012 | Ko et al. ....................... | 370/238 |
| 2012/0246339 A1* | 9/2012 | Huang et al. ................. | 709/239 |

\* cited by examiner

*Primary Examiner* — Hee Soo Kim

(57) ABSTRACT

An approach for providing latency measurements for a communication path of a transmission network is described. Measurement of latency associated with one or more communication paths of a transmission network is initiated. An increase in the latency within the transmission network is detected based on the latency measurement. One or more secondary communication paths of the transmission network are determined to address the latency increase. One of the secondary communication paths is selected according to a latency threshold.

19 Claims, 10 Drawing Sheets

METHOD AND SYSTEM FOR PROVIDING LATENCY DETECTION BASED ON AUTOMATED LATENCY MEASUREMENTS OF COMMUNICATION NETWORK PATHS

BACKGROUND INFORMATION

Service providers are continually challenged to deliver value and convenience to consumers by providing compelling network services and advancing the underlying technologies. For example, consumers are able access these services through data networks riding over transmission networks that are typically managed by service providers and separate from the data networks. In general, failure in a transmission network may be missed by the higher layer data networks since a failed communication path within the transmission network may be replaced with a backup path and data traffic associated with the services may continue to flow. Nonetheless, in some cases, consumers may notice significantly slower data traffic caused by a switch-over from an initial path to a backup path having much greater latency, which may lead to customer complaints and poor customer experience with the service providers.

Therefore, there is a need for an effective approach to identify and troubleshoot latency increases, for example, by providing automated latency measurements to detect latency increases and provide re-routing of communication network paths.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method, and software for providing latency detection based on automated latency measurements of communication network paths are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1A:
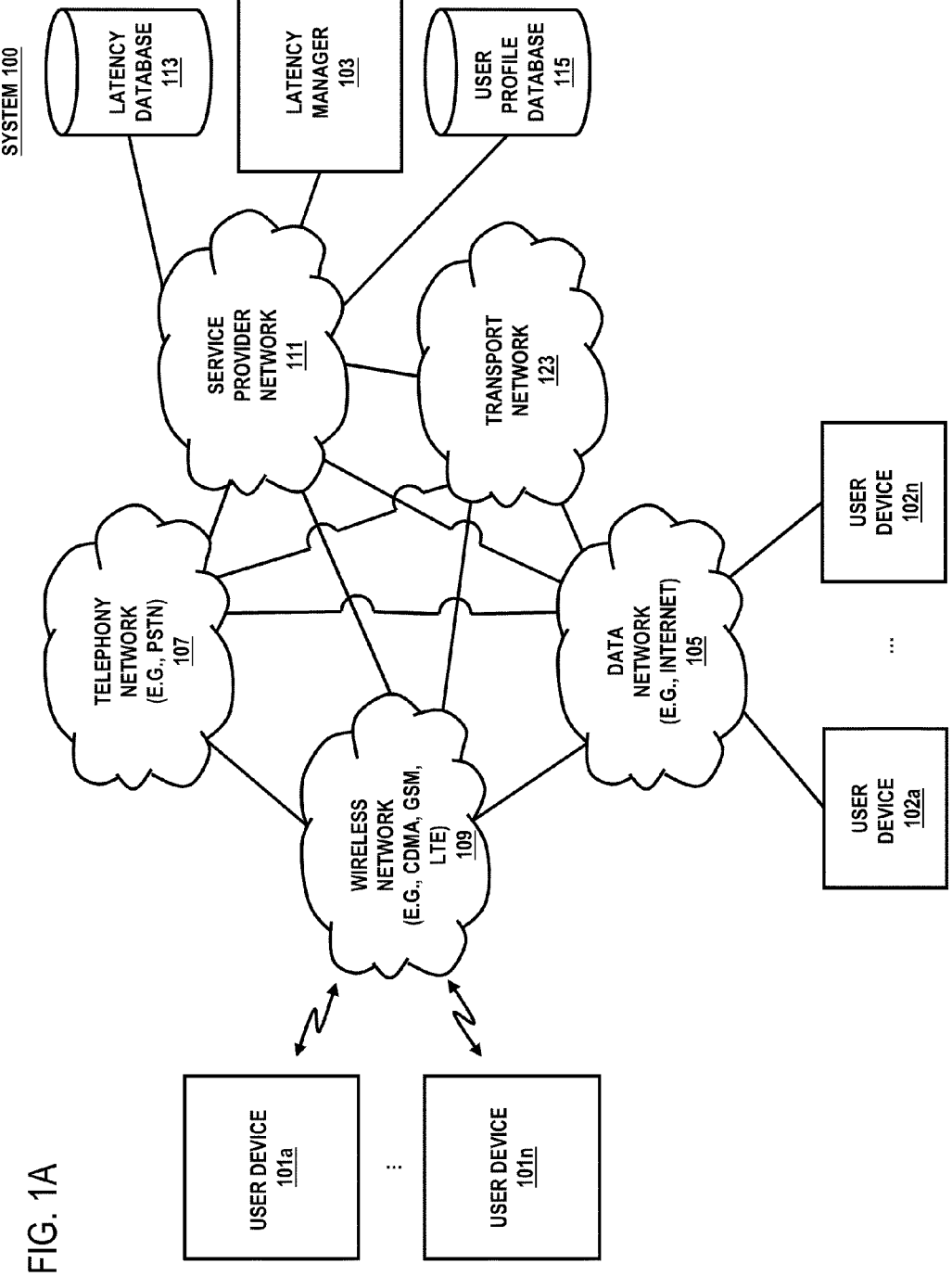
FIG. 1A is a diagram of a system capable of providing latency detection based on automated latency measurements of communication network paths, according to an embodiment.

FIG. 1A is a diagram of a system capable of providing latency detection based on automated latency measurements of communication network paths, according to an embodiment. For the purpose of illustration, the system 100 may include one or more user devices 101 and 102 (or user devices 101a-101n and 102a-102n) that may be utilized to access services (e.g., having communication paths that are monitored by a latency manager 103) over one or more networks (e.g., data network 105, telephony network 107, wireless network 109, service provider network 111, transport network 123, etc.). According to one embodiment, these services may be included as part of managed services supplied by a service provider (e.g., a wireless communication company) as a hosted or a subscription-based service made available to users of the user devices 101 and 102 through the service provider network 111. As such, the latency manager 103 may, for instance, be configured to facilitate automated identification and troubleshooting of latency increases associated with these services. In this regard, latency manager 103 may provide faster detection and troubleshooting of latency increases associated with one or more services, and, thus, improve customer experience associated with such services.

As shown, the latency manager 103 may be a part of or connected to the service provider network 111. In certain embodiments, the user devices 101 and 102 may include or have access to a latency database 113 and a user profile database 115. The latency database 113 may, for instance, be utilized to access or store current latency information, communication path data, history information, etc., associated with the communication paths within one or more transmission networks. The user profile database 115 may be utilized to access or store user information, such as user identifiers, passwords, device information associated with users, user access data, etc. While specific reference will be made thereto, it is contemplated that the system 100 may embody many forms and include multiple and/or alternative components and facilities. In addition, although various embodiments are described with respect to multi-protocol label switching (MPLS) standards, it is contemplated that the approach described herein may be used with other standards or techniques.

As indicated, there are typically several layers that carry customer data from one endpoint to another endpoint. These layers can affect each other in various ways, including loss of service as well as degradation of service. For example, data networks may ride over transmission networks (e.g., Synchronous Optical Networks (SONETs) or other types of optical transport networks) that are built with a high amount of redundancy such that a failure within a transmission network could occur without being noticed by a higher layer data network with respect to loss of service. These transmission networks may, for instance, utilize tools that check for continuity to determine whether rerouting of its communication paths is necessary. However, because failures in a transmission network may cause extensive rerouting of its communication paths to avoid loss of service, the extensive rerouting may cause a substantial increase in packet latency. In large cities, for instance, a path for a data signal may be rerouted such that the data signal has to take a circuitous path that adds kilometers of fiber as well as latency to the data path. Although this extensive rerouting does not show as a failure in the packet network, the significant increase in latency may be noticed by customers requiring low latency data circuits for applications that handle voice, video, or other delay-sensitive data. As such, the latency increase could render a customer's application unusable even though the data circuit appears to be up and operational, resulting in customer complaints and poor customer experience.

To address these issues, the system 100 of FIG. 1 provides the capability to facilitate automated latency measurements of one or more communication paths of a transmission network to detect latency increases within the transmission network (e.g., in addition to continuity checks for the communication paths of the transmission network). By way of example, the latency manager 103 may initiate measurement of latency associated with one or more communication paths of a transmission network, and detect an increase in the latency within the transmission network based on the latency measurement. These communication paths may, for instance, include one or more label-switched paths (LSPs), and the label-switched paths may include a plurality of label edge routers (LERs) and/or a plurality of label switch routers (LSRs) associated with a MPLS standard. Moreover, the latency manager 103 may determine one or more secondary communication paths within the transmission network to address the latency increase, and select one of the secondary communication paths according to a latency threshold.

Figure 1B:
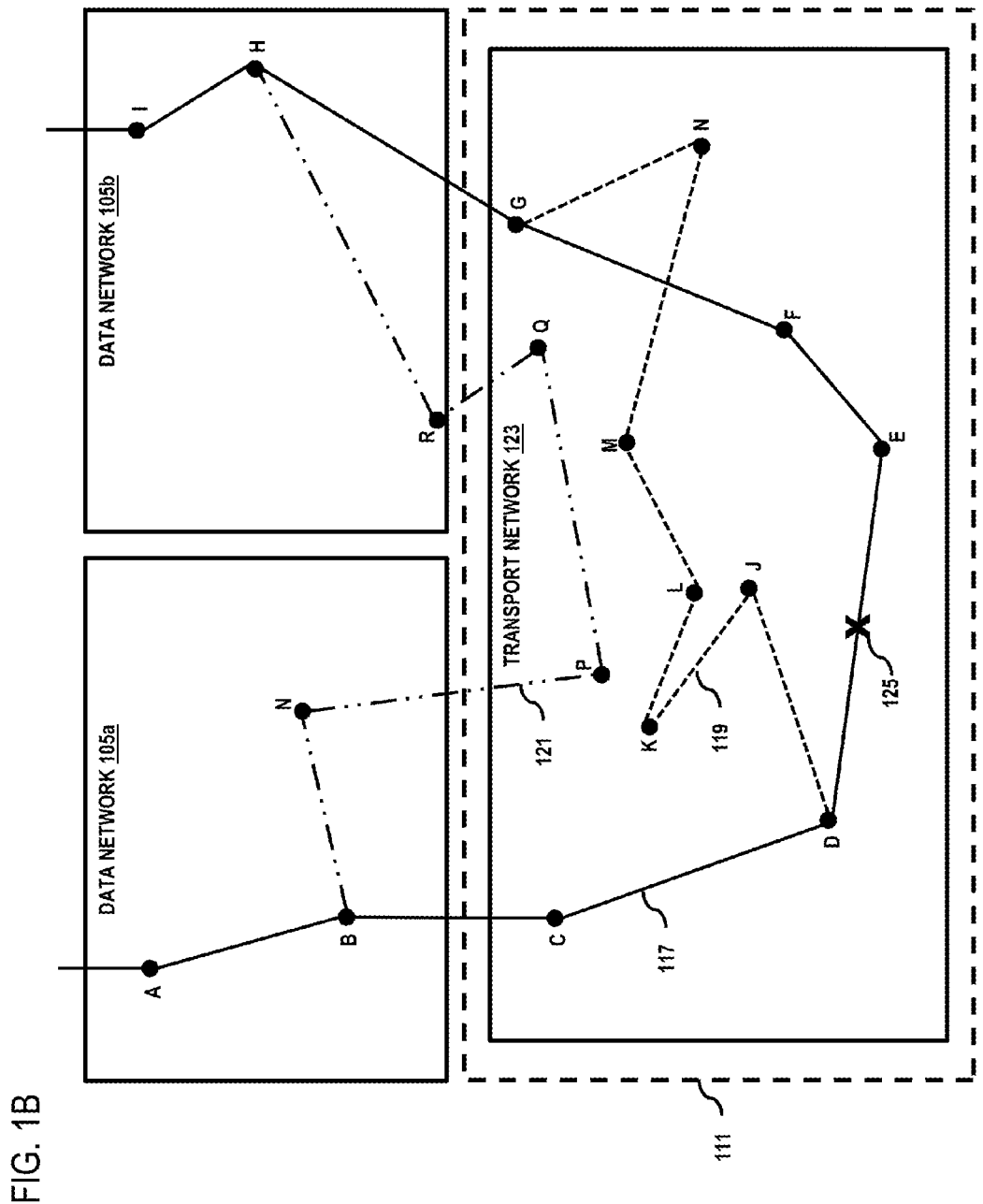
FIG. 1B is a diagram of a scenario utilizing latency detection based on automated latency measurements of communication network paths, according to an embodiment.

In one scenario, as illustrated in FIG. 1B, communication paths 117, 119, and 121 may span across one or more data networks 105 (e.g., data networks 105), and one or more transport networks 123. Communication path 117 may include nodes A, B, C, D, E, F, G, H, and I, communication path 119 may include nodes A, B, C, D, J, K, L, M, N, G, H, and I, and communication path 121 may include nodes A, B, N, P, Q, R, H, and I, where communication path 117 may be a primary path for data communications between a user client and a service host of a particular service. As shown by indicator 125, primary communication path 117 may experience a failure between nodes D and E. As such, data communications between the user client and the service may be automatically switched from the primary communication path 117 to the communication path 119 to provide continuity of the service to the user client. However, communication path 119 may be a sub-optimal path that has a latency greater than a predetermined latency threshold set for the data communications between the user client and the service host due to a higher number of nodes, a longer fiber path, etc.

Nonetheless, the latency manager 103 may detect the latency increase associated with the data communications between the user client and the service host based on automated latency measurements (e.g., performed on a periodic basis). As a result, the latency manager 103 may determine other communications paths to address the latency increase, and select one of the other communication paths according to the predetermined latency threshold (e.g., communication path 121 may be selected if it is determined that latency associated with the communication path 121 is less than or equal to the predetermined latency threshold). Thereafter, the latency manager 103 may initiate one or more actions relating to resolution of the latency issue (e.g., notify administrators, operators, or users, initiate switching of sub-optimal paths to optimal paths, etc.).

In another embodiment, the latency manager 103 may determine that one of the communication paths is associated with the latency increase, and initiate switching of the one communication path to the one secondary communication path based on the detection of the latency increase. For example, with respect to FIG. 1B, primary communication path 117 may be determined to be associated with the latency increase since the failure between nodes D and E of communication path 117 caused the switch to the sub-optimal communication path 119. The communication path 119 may also be determined to be associated with the latency increase as a result of latency measurements indicating that the latency of the communication path 119 is greater than the latency threshold. By way of example, the communication path 117 may have had a measured latency of 200 milliseconds (ms) prior to the failure, the communication path 119 may currently have a latency of 800 ms (e.g., due to increased distance, nodes, etc.), and the communication path 121 may have a latency of 400 ms. As indicated, the latency manager 103 may determine that the latency associated with the communication path 119 (e.g., 800 ms) is greater than the latency threshold, and that the latency associated with the communication path 121 (e.g., 400 ms) is less than the latency threshold. Thus, the latency manager 103 may initiate a switch from the communication path 119 to the communication path 121 for the data communications between the user client and the service host. Furthermore, in some embodiments, the latency manager 103 may determine the most efficient or optimal secondary communication path of the one or more secondary communication paths, and replace the one communication path with respective efficient/optimal secondary communication path. Thus, in this way, negative effects upon network users caused by failures and latency increases may be mitigated (e.g., lower latency, lower jitter, maximum available bandwidth, less congestion, or a combination thereof).

In another embodiment, the latency manager 103 may determine a switch-back timer associated with the switching of one communication path to the one secondary communication path, switching of another one of the communication paths to the one communication path, or a combination thereof. The latency manager 103 may then initiate switching of the one secondary communication path back to the one communication path, switching of the one secondary communication path or the one communication path back to the another one communication path, or a combination thereof based on an expiration of the switch-back timer. For example, with respect to FIG. 1B, a 30-minute switch-back timer (or a reoptimization timer with a different expiration time period) may be set when the communication path for the data communications between the user client and the service host is switched from the communication path 117 to the communication path 119. Upon expiration of the switch-back timer, the latency manager 103 may determine whether the failure of the communication path 117 has been resolved. If, for instance, the failure has been resolved, the latency manager 103 may initiate switching of the communication path 121 back to the communication path 117 for the data communications between the user client and the service host. In this way, the latency manager 103 may be utilized to move a communication path back onto its primary path from a sub-optimal path based on the switch-back timer.

In another embodiment, the latency manager 103 may cause the setting of the latency threshold based on data traffic over the transmission network. By way of example, the latency threshold may be dynamically set based on data traffic over the transmission network that may change according to the time, changes within the transmission network, etc. In one use case, for instance, there may typically be higher levels of usage of communication paths during business hours and lower levels of usage of communication paths at night. As such, the latency threshold may be a higher latency threshold during business hours and a lower latency threshold at night. Moreover, the latency threshold may dynamically change as typical latency patterns change, for instance, as a result of as new nodes being added to the communication paths, additional fiber links being added to the transmission network to create additional paths, etc.

In another embodiment, the latency manager 103 may determine low-level and high-level latency thresholds based on the data traffic over the transmission network, and the latency threshold may be dynamically set based on the low-level and high-level latency thresholds. For example, when there are high levels of data traffic (e.g., when data usage is high) in the transmission network, the latency threshold may be at a higher level to better indicate latency increases that are not simply due to the high levels of data traffic. If, for instance, a latency threshold is originally set to 7 ms and data traffic increases, the latency threshold may be dynamically raised to a new level of 12 ms to provide more accurate detection of latency increase that are not merely due to increased data usage.

In another embodiment, the latency manager 103 may determine a threshold number of failed attempts to satisfy the latency threshold during a predefined period, and the detection of latency increase may be based upon a determination that the failed-attempts threshold number has been reached during the predefined period. In one scenario, the predefined period may be a time period of 10 seconds, and the failed-attempts threshold number may be set to 5. As discussed, latency measurements of the communication paths may be automatically performed on a periodic basis (or according to some predetermined schedule). If, for instance, it is determined that the latency of a particular communication path was greater than the latency threshold during 5 latency measurements taken within the predefined 10-second period, the latency manager 103 may determine that there is a latency increase (e.g., for data communications of a service between a user client and a service host) associated with that communication path. In this way, false detections of latency increases may be prevented, for instance, since the latency measurements may be required to fail a predetermined number of times before latency resolution actions are taken.

In another embodiment, the latency manager 103 may initiate generation of one or more ping messages for transmission to one or more nodes of the communication paths according to a predetermined schedule, and determine that the failed attempts threshold number has been reached during the predefined period based on the ping messages. By way of example, LSP ping initiation messages may be sent on a periodic basis to LSRs or LERs to trigger those LSRs or LERs to start sending LSP ping echo requests to other LSRs or LERs, which then send LSP ping echo replies. These LSP ping echo requests and replies may then be utilized to determine latency measurements of one or more LSPs to determine whether a latency increase within the transmission network has occurred. In one use case, when a LSP ping echo request for a particular node becomes lost or delayed for a predetermined period of time, such a situation may signal that an increase in latency has occurred (e.g., the predetermined time may be based on previous latency data associated with the particular nodes). In another scenario, a LSR or LER receiving a LSP ping echo request may send a LSP ping echo reply to verify receipt of the LSP ping request. As indicated, the LSP echo request and reply may be utilized to calculate the current latency of the LSP for detecting latency increases (e.g., based on a comparison against a latency threshold). Moreover, the LSP echo ping requests and replies may be initiated for a plurality of LSRs and LERs, for instance, on a periodic basis to provide continual latency measurement information.

In another embodiment, the latency manager 103 may initiate generation of one or more alarms to initiate troubleshooting for a communication path that is determined to be associated with the latency increase. In one scenario, for instance, service providers or operators may receive a notification with respect to the latency increase along with information that will enable them to begin troubleshooting. Additionally, or alternatively, the notifications may trigger automated switching of an affected communication path to a secondary communication path to mitigate the negative effects of the latency increase.

In another embodiment, the latency manager 103 may store information with respect to the latency measurement and other latency measurements of the one or more communication paths of the transmission network that are performed at different times. In addition, the latency manager 103 may initiate a reoptimization of the transmission network with respect to the one or more communication paths based on the stored information. For example, the latency measurements may be collected over time and stored in the latency database 113. As such, an analysis may be performed on the stored latency measurements for modification of the communication paths of the transmission network to decrease the latency associated with such paths.

It is noted that the user devices 101 and 102, the latency manager 103, and other elements of the system 100 may be configured to communicate via the service provider network 111. According to certain embodiments, one or more networks, such as the data network 105, the telephony network 107, and/or the wireless network 109, may interact with the service provider network 111. The networks 105-111 may be any suitable wireline and/or wireless network, and be managed by one or more service providers. For example, the data network 105 may be any local area network (LAN), metropolitan area network (MAN), wide area network (WAN), the Internet, or any other suitable packet-switched network, such as a commercially owned, proprietary packet-switched network, such as a proprietary cable or fiber-optic network. The telephony network 107 may include a circuit-switched network, such as the public switched telephone network (PSTN), an integrated services digital network (ISDN), a private branch exchange (PBX), or other like network. Meanwhile, the wireless network 109 may employ various technologies including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like.

Although depicted as separate entities, the networks 105-111 may be completely or partially contained within one another, or may embody one or more of the aforementioned infrastructures. For instance, the service provider network 111 may embody circuit-switched and/or packet-switched networks that include facilities to provide for transport of circuit-switched and/or packet-based communications. It is further contemplated that the networks 105-111 may include components and facilities to provide for signaling and/or bearer communications between the various components or facilities of the system 100. In this manner, the networks 105-111 may embody or include portions of a signaling system 7 (SS7) network, Internet protocol multimedia subsystem (IMS), or other suitable infrastructure to support control and signaling functions.

Further, it is noted that the user devices 101 and 102 may be any type of mobile or computing terminal including a mobile handset, mobile station, mobile unit, multimedia computer, multimedia tablet, communicator, netbook, Personal Digital Assistants (PDAs), smartphone, media receiver, personal computer, workstation computer, set-top box (STB), digital video recorder (DVR), television, automobile, appliance, etc. It is also contemplated that the user devices 101 and 102 may support any type of interface for supporting the presentment or exchange of data. In addition, user devices 101 and 102 may facilitate various input means for receiving and generating information, including touch screen capability, keyboard and keypad data entry, voice-based input mechanisms, accelerometer (e.g., shaking the user device 101 or 102), and the like. Any known and future implementations of user devices 101 and 102 are applicable. It is noted that, in certain embodiments, the user devices 101 and 102 may be configured to establish peer-to-peer communication sessions with each other using a variety of technologies—i.e., near field communication (NFC), Bluetooth, infrared, etc. Also, connectivity may be provided via a wireless local area network (LAN). By way of example, a group of user devices 101 and 102 may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each user device 101 or 102, i.e., IP addresses that are accessible to devices connected to the service provider network 111 as facilitated via a router.

Figure 2:
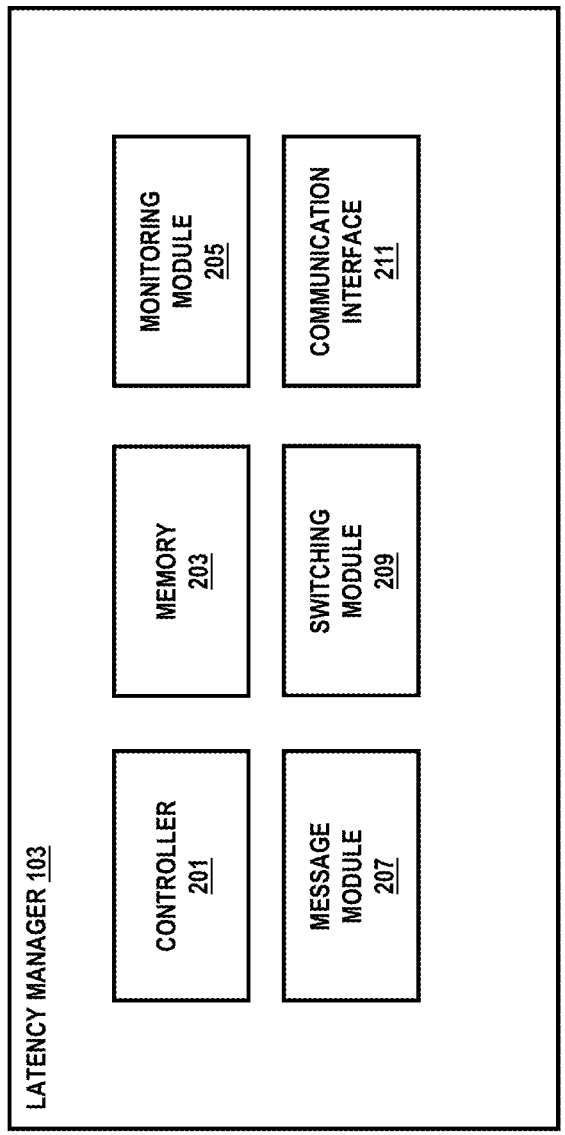
FIG. 2 is a diagram of the components of a latency manager, according to an embodiment.

FIG. 2 is a diagram of the components of a latency manager, according to an embodiment. By way of example, the latency manager 103 includes one or more components for providing latency detection based on automated latency measurements of communication network paths. It is contemplated that the functions of these components may be combined in one or more components or performed by other components of equivalent functionality. In this embodiment, latency manager 103 includes controller 201, memory 203, a monitoring module 205, a message module 207, a switching module 209, and a communication interface 211.

The controller 201 may execute at least one algorithm (e.g., stored at the memory 203) for executing functions of the latency manager 103. For example, the controller 201 may interact with the monitoring module 205 to initiate measurement of latency associated with one or more communication paths of a transmission network. These communication paths may, for instance, include one or more LSPs, and the LSPs may include a plurality of LERs and/or a plurality of LSRs associated with a MPLS standard.

Moreover, the monitoring module 205 may detect a latency increase (e.g., for data communications associated with a service between two endpoints) within the transmission network based on the latency measurement. In certain embodiments, the monitoring module 205 may work with the message module 207 to initiate generation of one or more ping messages for transmission to one or more nodes (e.g., LERs, LSRs, etc.) according to a predetermined schedule. As indicated, these ping messages (e.g., LSP echo ping requests and replies) may be utilized to measure the latencies associated with the communication paths. These latency measurements may then be used to determine whether a latency increase has occurred within the transmission network.

In various embodiments, the monitoring module 205 may determine one or more secondary communication paths of the transmission network to address the latency increase, and select one of the secondary communication paths according to a latency threshold. The monitoring module 205 may also determine the particular communication path associated with the latency increase, and interact with the switching module 209 to initiate switching of the communication path to the selected secondary communication path based on the detection of the latency increase.

In addition, the controller 201 may utilize the communication interface 211 to communicate with other components of the latency manager 103, the user devices 101 and 102, and other components of the system 100. For example, the controller 201 may direct the communication interface 211 to receive and transmit updates to the latency database 113, to transmit notifications to users with respect to network latency increases and troubleshooting, to trigger switching from an initial communication path to a secondary communication path, etc. Further, the communication interface 211 may include multiple means of communication. For example, the communication interface 211 may be able to communicate over short message service (SMS), multimedia messaging service (MMS), internet protocol, instant messaging, voice sessions (e.g., via a phone network), email, or other types of communication.

Figure 3:
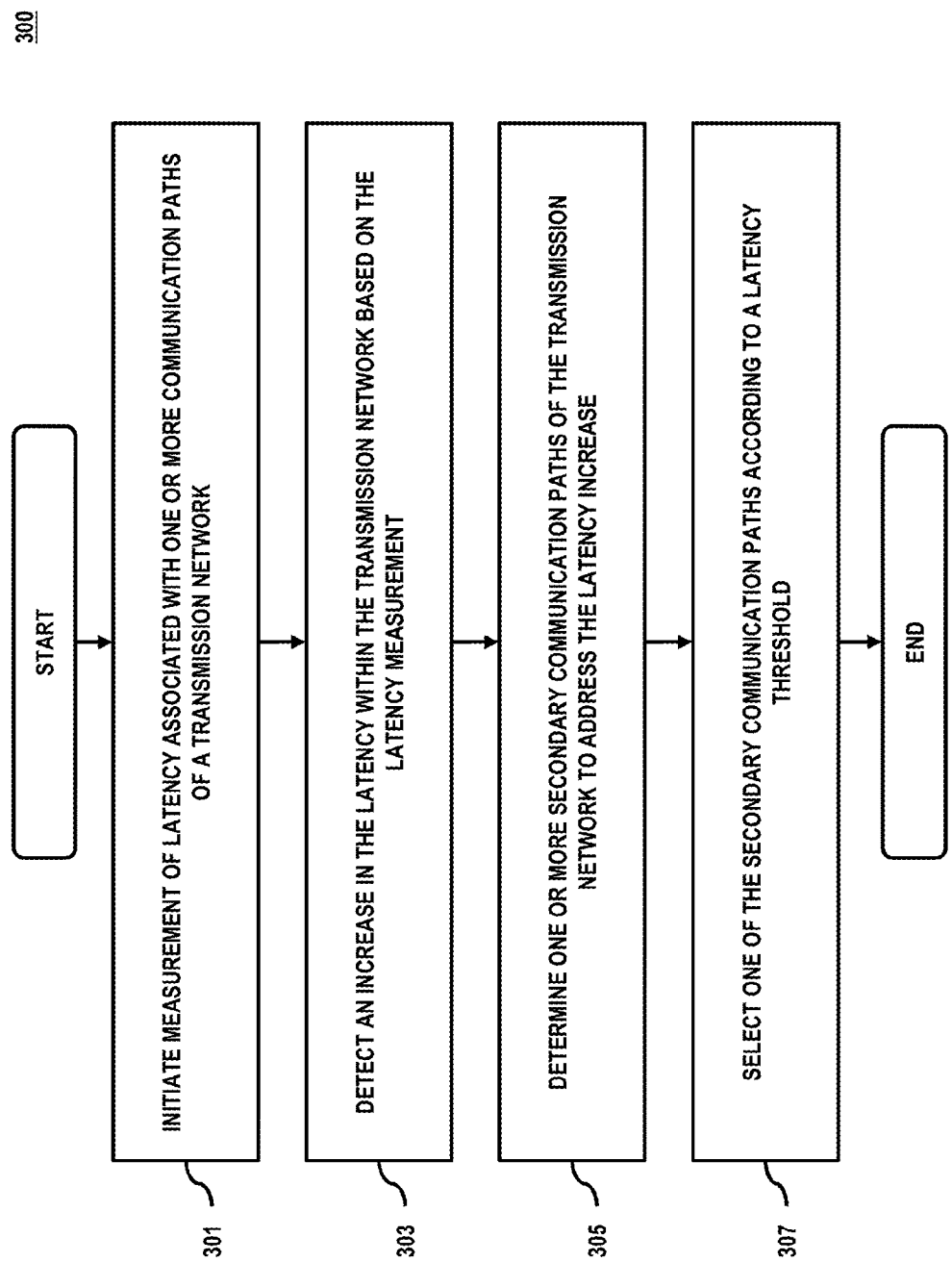
FIG. 3 is a flowchart of a process for providing latency detection based on automated latency measurements of communication network paths, according to an embodiment.

FIG. 3 is a flowchart of a process for providing latency detection based on automated latency measurements of communication network paths, according to an embodiment. For the purpose of illustration, process 300 is described with respect to FIGS. 1A and 1B. It is noted that the steps of the process 300 may be performed in any suitable order, as well as combined or separated in any suitable manner. In step 301, the latency manager 103 may initiate latency measurements associated with one or more communication paths of a transmission network. As mentioned, these communication paths may include one or more LSPs, and the LSPs may include a plurality of LERs and/or a plurality of LSRs associated with a MPLS standard. LERs and LSRs of a LSP may, for instance, be caused to generate and transmit LSP ping echo requests on a periodic basis, and to reply to LSP ping echo request, to calculate latency associated with the LSP.

In step 303, the latency manager 103 may detect a latency increase within the transmission network based on the latency measurements. For example, as shown in FIG. 1B, data communications between nodes A and I may initially travel through communication path 117. However, due to a failure between nodes D and E, the communication path for the data communications between nodes A and I may automatically be switched from communication path 117 to communication path 119. If, for instance, the new communication path 119 does not satisfy the latency threshold for the data communications between the two nodes, a latency increase may be detected for the data communications.

Thus, in steps 305 and 307, the latency manager may determine one or more secondary communication paths within the transmission network to address the latency increase, and select one of the secondary communication paths according to a latency threshold. In certain embodiments, the selection of the one secondary communication path may be based on a comparison of the secondary communication paths to determine the most efficient or optimized paths of the secondary communication paths. Thereafter, the latency manager 103 may initiate one or more actions relating to resolution of the latency issue, for instance, by notifying administrators, operators, or users, initiating switching of sub-optimal paths to optimal paths, etc.

Figure 4:
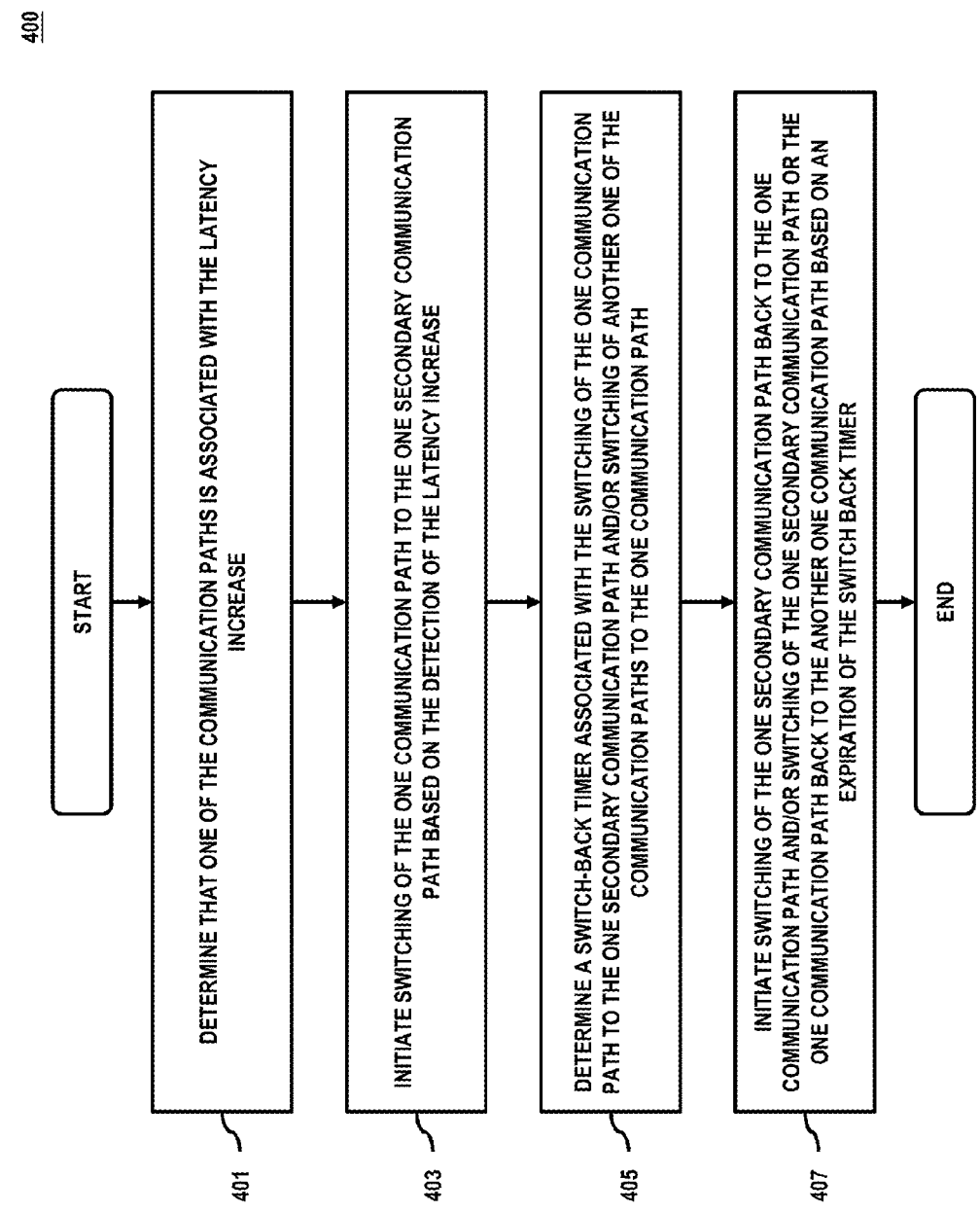
FIG. 4 is a flowchart of a process for automated switching and switch-back of communication network paths, according to an embodiment.

FIG. 4 is a flowchart of a process for automated switching and switch-back of communication network paths, according to an embodiment. For the purpose of illustration, process 400 is described with respect to FIGS. 1A and 1B. It is noted that the steps of the process 400 may be performed in any suitable order, as well as combined or separated in any suitable manner. In step 401, the latency manager 103 may determine that one of the communication paths is associated with latency increase. For example, with respect to FIG. 1B, primary communication path 117 may be determined to be associated with the latency increase since the failure between nodes D and E of communication path 117 caused the switch to the sub-optimal communication path 119. The communication path 119 may also be determined to be associated with the latency increase as a result of latency measurements indicating that the latency of the communication path 119 is greater than the latency threshold.

In step 403, the latency manager 103 may initiate switching of the one communication path to the one secondary communication path based on the detection of the latency increase. As an example, with respect to FIG. 1B, if the communication path 119 is determined to be associated with the detected latency increase, the latency manager 103 may cause a second switch for the data communications from the communication path 119 to the communication path 121 based on a determination that the communication path 121 satisfies the latency threshold for the data communications between nodes A and I of FIG. 1B.

In step 405, the latency manager 103 may determine a switch-back timer associated with the switching of the one communication path to the one secondary communication path, switching of another one of the communication paths to the one communication path, or a combination thereof. In addition, in step 407, the latency manager 103 may initiate switching of the one secondary communication path back to the one communication path, switching of the one secondary communication path or the one communication path back to the another one communication path, or a combination thereof based on an expiration of the switch-back timer. For example, with respect to FIG. 1B, a switch-back timer may be set for a predetermined amount of time when the communication path for the data communications between nodes A and I is switched from the communication path 117 to the communication path 119. Upon expiration of the switch-back timer, the latency manager 103 may determine whether the failure of the communication path 117 has been resolved. If, for instance, the failure has been resolved, the latency manager 103 may initiate switching of the communication path 121 back to the communication path 117 for the data communications. In this way, the latency manager 103 may be utilized to move a communication path back onto its primary path from a sub-optimal path based on the switch-back timer.

Figure 5:
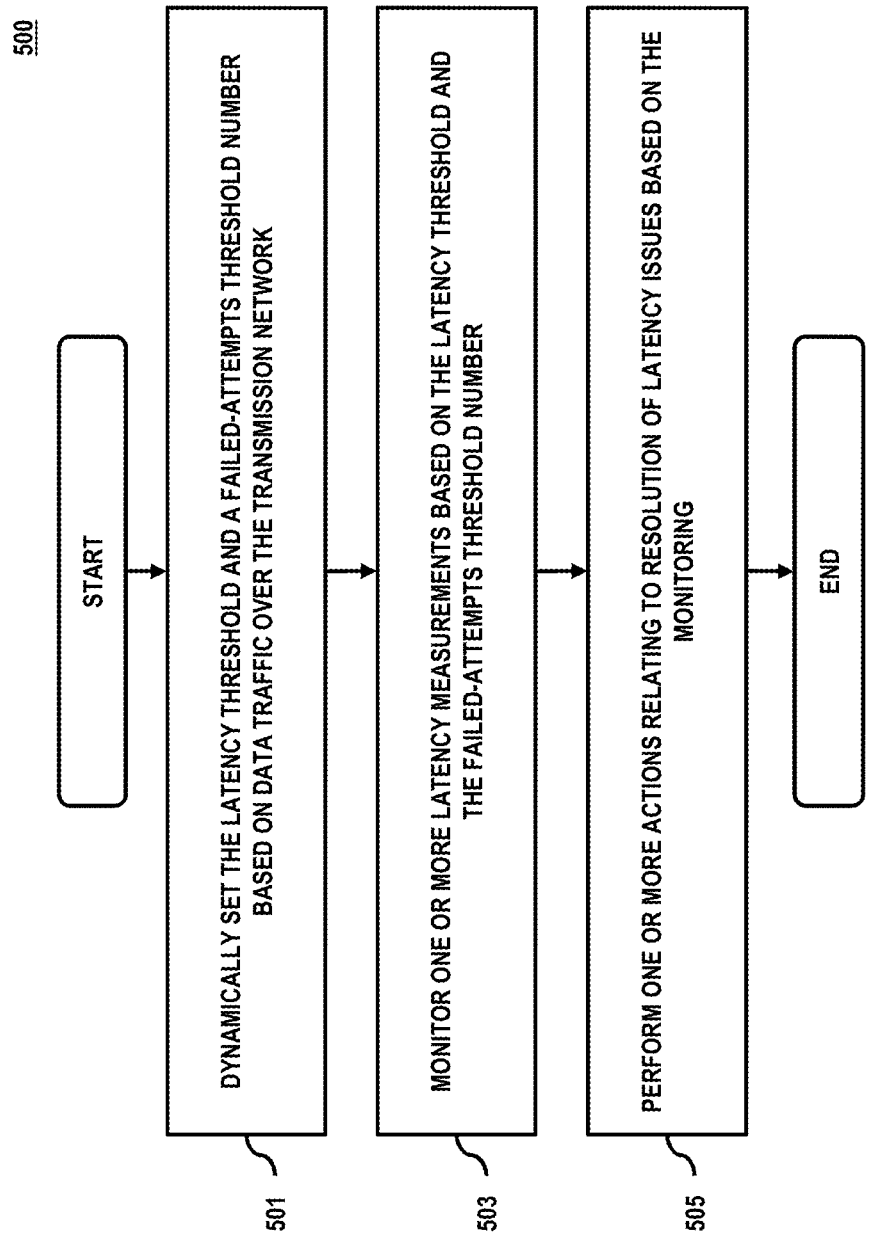
FIG. 5 is a flowchart of a process for setting and monitoring latency within the communication path, according to an embodiment.

FIG. 5 is a flowchart of a process for latency detection using automated latency measurements along with latency and failed-attempts thresholds, according to an embodiment. For the purpose of illustration, process 500 is described with respect to FIG. 1A. It is noted that the steps of the process 500 may be performed in any suitable order, as well as combined or separated in any suitable manner. In step 501, the latency manager 103 may dynamically set a latency threshold and a failed-attempts threshold number (e.g., a threshold number of failed attempts to satisfy the latency threshold during a predefined period) based on data traffic (e.g., changes in data travel information due to congestion, addition or removal of nodes, etc.) over the transmission network. In one use case, the latency threshold and the failed-attempts threshold number may be dynamically set based on previously collected latency measurement data from nodes of the communication paths. In another use case, the latency number and the failed-attempts threshold number may be dynamically set based on an analysis of data traffic over the transmission network. For example, the latency threshold may dynamically change as typical latency patterns change as a result of new nodes being added to the communication paths, additional fiber links being added to the transmission network to create additional paths, etc.

In step 503, the latency manager 103 may monitor one or more latency measurements of the communication paths based on the latency threshold and the failed-attempts threshold number. For example, the monitoring of the latency measurements may determine whether a communication path for data communications of a service between two endpoints has failed to satisfy the latency threshold for a predetermined threshold number of times during a predefined period. In one use case, the predefined period may be a time period of, e.g., 10 seconds, and the failed-attempts threshold number may be set to, e.g., 5. If, for instance, it is determined that the latency of a particular communication path was greater than the latency threshold during 5 latency measurements taken within the predefined 10-second period, the latency manager 103 may report a latency increase associated with the communication path or perform any other action relating to resolution of latency issues (step 505).

Figure 6:
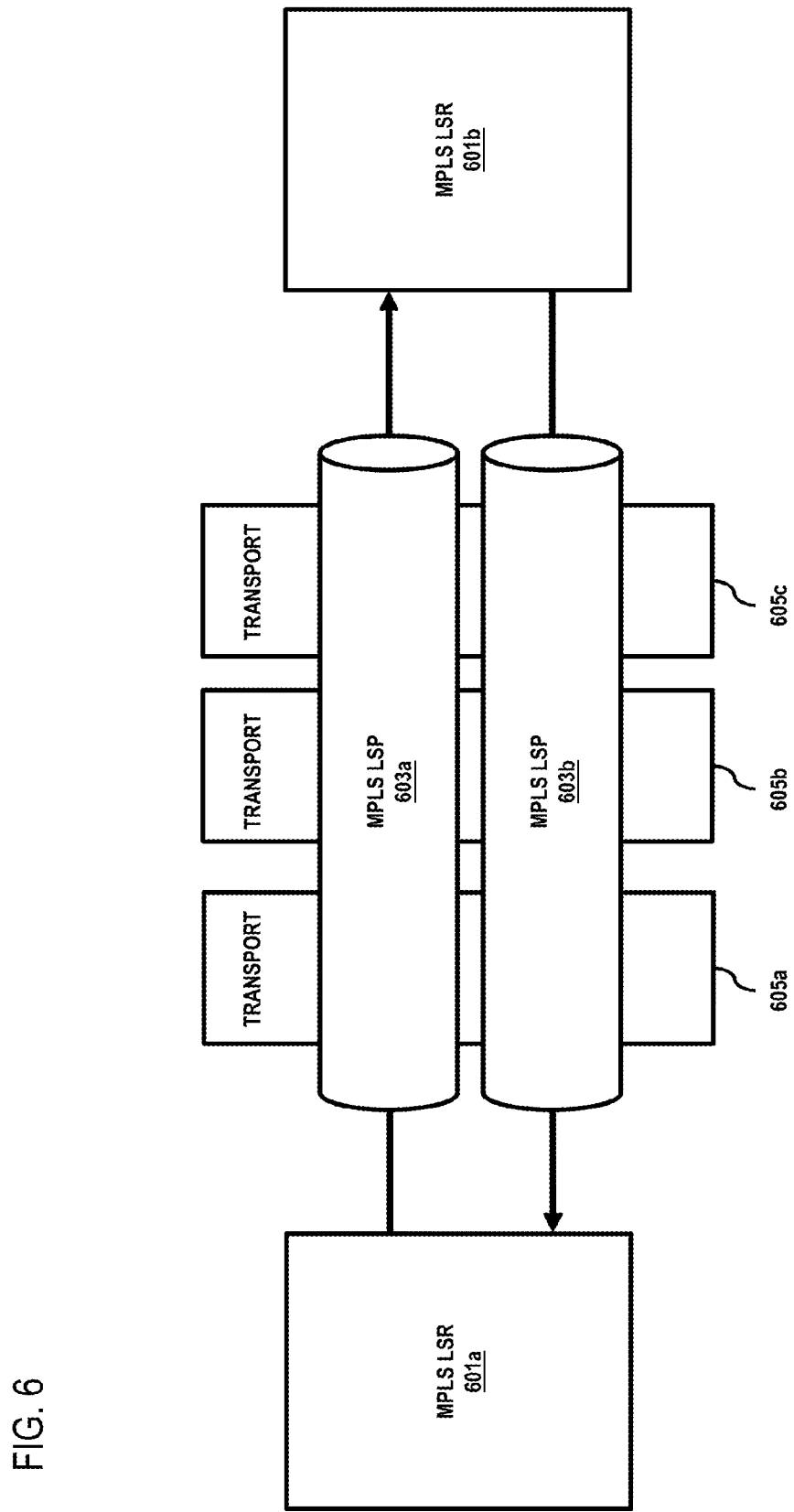
FIG. 6 diagram illustrating an architecture over which automated latency measurements may be performed, according to an embodiment.

FIG. 6 is a diagram illustrating an architecture over which automated latency measurements may be performed, according to an embodiment. As shown, in FIG. 6, nodes 601*a* and 601*b* may be according to a MPLS standard, and the communication path 603 (e.g., including paths 603*a* and 603*b*) may include unidirectional LSPs that span over multiple transport networks 605*a*-605*c*. As discussed, the latency manager 103 may monitor a communication path of an transmission network using a number of techniques, such as the generation of one or more ping messages by various LSRs and LERs to detect a latency increase associated with the communication path 603.

Figure 7:
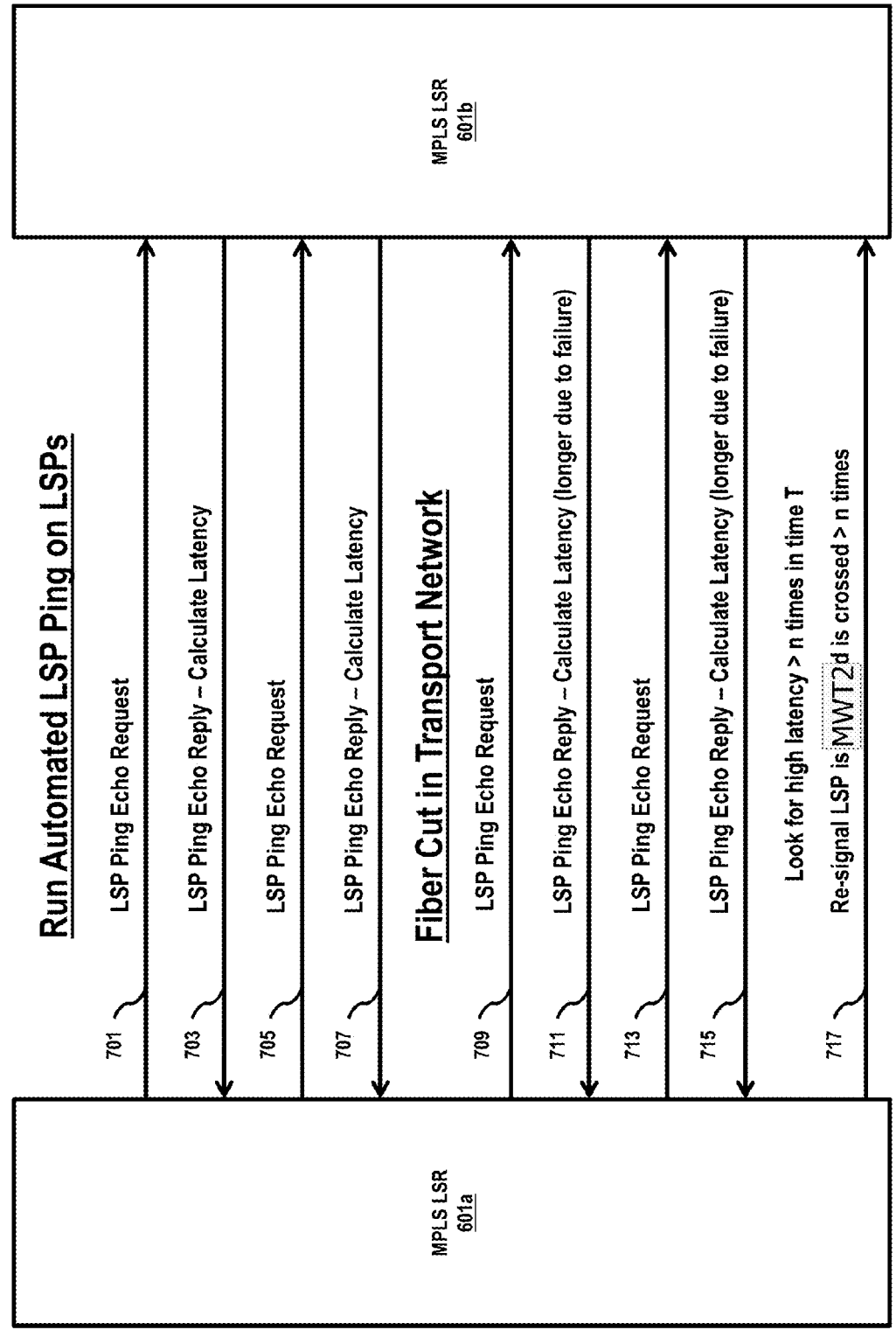
FIG. 7 is a diagram illustrating the transmission of ping messages for automated latency detection, according to an embodiment.

FIG. 7 is a diagram illustrating the transmission of ping messages for automated latency detection, according to an embodiment. As shown, in FIG. 7, automated LSP ping may be initiated on nodes 601*a* and 601*b* to initiate periodic sending and receiving of ping messages in an automated fashion (e.g., LSP ping echo requests 701, 705, 709, and 713, and LSP ping echo replies 703, 707, 711, and 715). As indicated, the latency manager 103 may utilize information with respect to the sending and receiving of these ping messages to calculate latency of a communication path (e.g., the path between nodes 601*a* and 601*b*). For example, the round trips (e.g., the combination of a LSP ping echo request and a LSP ping echo reply) of these messages may be used to calculate the latency of the communication path.

If, for instance, there is a fiber cut in the transport network between nodes 601*a* and 601*b*, data communications between nodes 601*a* and 601*b* may be rerouted to another communication path with higher latency (e.g., as indicated by replies 711 and 715) due to the new communication path being a longer path with respect to physical distance, the new path having more nodes between nodes 601*a* and 601*b*, etc. In addition, if the latency measurements are determined to have failed the latency threshold N times over a period of time T, reporting of the latency increase or other actions relating to resolution of the latency issue may be initiated (e.g., as indicated by signal 717).

The processes described herein for providing latency detection based on automated latency measurements of communication network paths may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
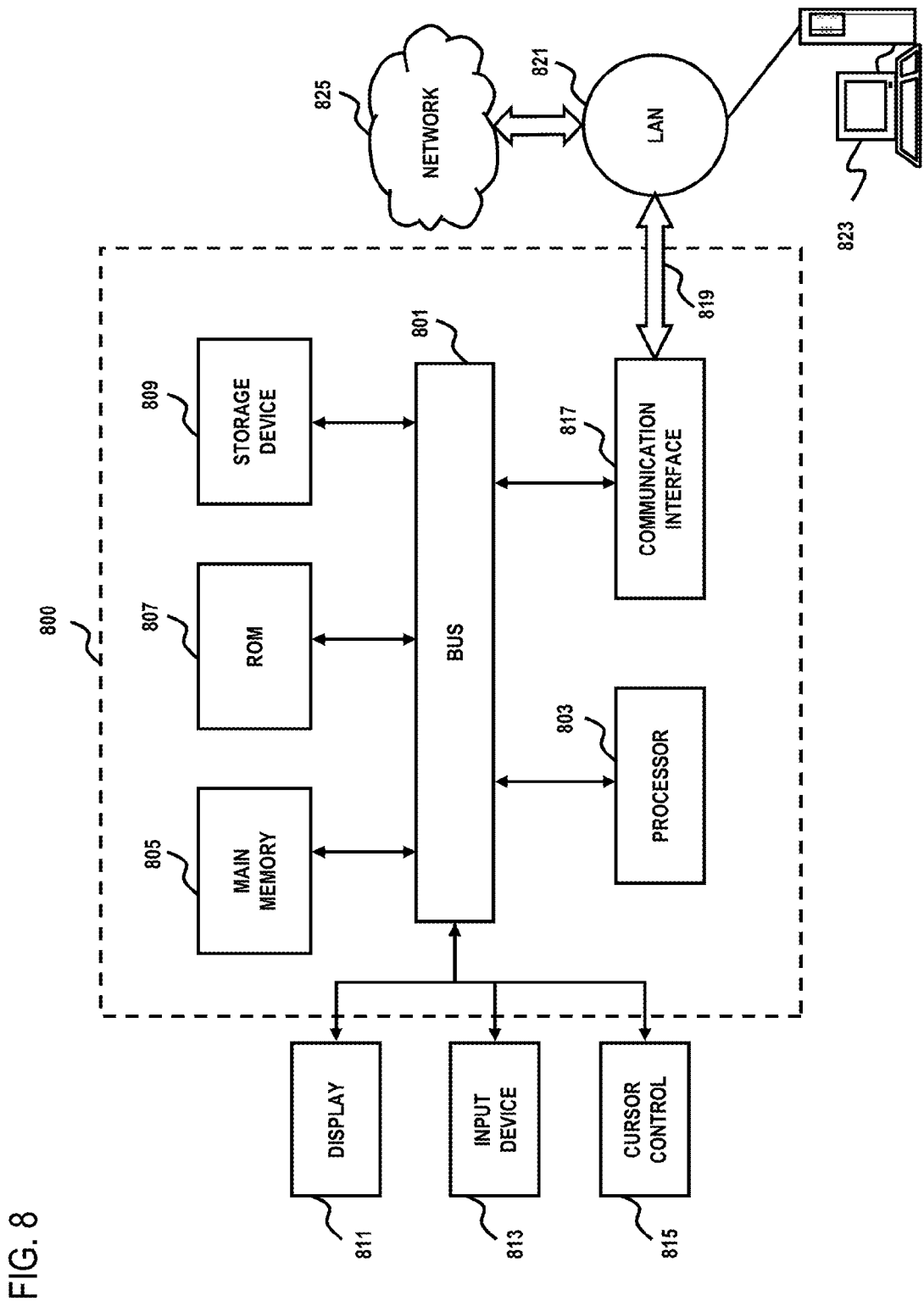
FIG. 8 is a diagram of a computer system that can be used to implement various embodiments.

FIG. 8 illustrates computing hardware (e.g., computer system) upon which an embodiment of the invention can be implemented. The computer system 800 includes a bus 801 or other communication mechanism for communicating information and a processor 803 coupled to the bus 801 for processing information. The computer system 800 also includes main memory 805, such as random access memory (RAM) or other dynamic storage device, coupled to the bus 801 for storing information and instructions to be executed by the processor 803. Main memory 805 also can be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g., for Ethernet or an Asynchronous Transfer Mode (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g., a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 9:
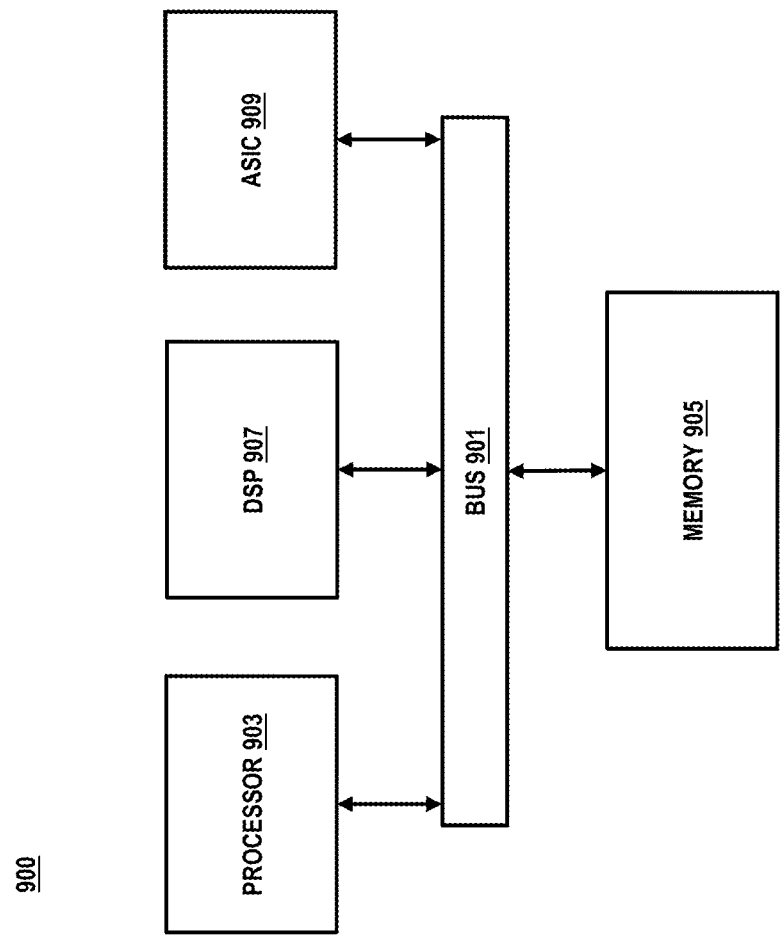
FIG. 9 is a diagram of a chip set that can be used to implement an embodiment of the invention.

FIG. 9 illustrates a chip set 900 upon which an embodiment of the invention may be implemented. Chip set 900 is programmed to provide latency detection based on automated latency measurements of communication network paths as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps of providing latency detection based on automated latency measurements of communication network paths.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide latency detection based on automated latency measurements of communication network paths. The memory 905 also stores the data associated with or generated by the execution of the inventive steps.

While certain embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
initiating measurement of latency associated with one or more communication paths of a transmission network;
detecting an increase in the latency within the transmission network based on the latency measurement;
determining one or more secondary communication paths of the transmission network to address the latency increase;
selecting one of the secondary communication paths according to a latency threshold; and
determining a threshold number of failed attempts to satisfy the latency threshold during a predefined period,
wherein the detection of the latency increase is further based on a determination that the failed-attempts threshold number has been reached during the predefined period.

2. A method according to claim 1, further comprising:
determining that one of the communication paths is associated with the latency increase; and
initiating switching of the one communication path to the one secondary communication path based on the detection of the latency increase.

3. A method according to claim 2, further comprising:
determining a switch-back timer associated with the switching of the one communication path to the one secondary communication path, switching of another one of the communication paths to the one communication path, or a combination thereof; and
initiating switching of the one secondary communication path back to the one communication path, switching of the one secondary communication path or the one communication path back to the another one communication path, or a combination thereof based on an expiration of the switch-back timer.

4. A method according to claim 1, further comprising:
setting the latency threshold based on data traffic over the transmission network.

5. A method according to claim 4, further comprising:
determining a low-level latency threshold and a high-level latency threshold based on the data traffic over the transmission network,
wherein the latency threshold is dynamically set based on the low-level latency threshold and the high-level latency threshold.

6. A method according to claim 1, further comprising:
initiating generation of one or more ping messages for transmission to one or more nodes of the communication paths according to a predetermined schedule; and
determining that the failed-attempts threshold number has been reached during the predefined period based on the ping messages.

7. A method according to claim 1, wherein the communication paths include one or more label-switched paths, and the label-switched paths include a plurality of label edge routers, a plurality of label switch routers, or a combination thereof associated with a multi-protocol labeling switch standard.

8. A method according to claim 1, further comprising:
generating a notification associated with the latency increase; and
presenting the notification.

9. An apparatus comprising:
at least one processor; and at least one memory including computer program code for one or more programs, the at least one memory and the computer program code configured to, with the at least one processor, cause the apparatus to perform at least the following, initiate measurement of latency associated with one or more communication paths of a transmission network;

detect an increase in the latency within the transmission network based on the latency measurement;

determine one or more secondary communication paths of the transmission network to address the latency increase;

select one of the secondary communication paths according to a latency threshold; and determine a threshold number of failed attempts to satisfy the latency threshold during a predefined period, wherein the detection of the latency increase is further based on a determination that the failed-attempts threshold number has been reached during the predefined period.

10. An apparatus according to claim 9, wherein the apparatus is further caused to:

determine that one of the communication paths is associated with the latency increase; and initiate switching of the one communication path to the one secondary communication path based on the detection of the latency increase.

11. An apparatus according to claim 10, wherein the apparatus is further caused to:

determine a switch-back timer associated with the switching of the one communication path to the one secondary communication path, switching of another one of the communication paths to the one communication path, or a combination thereof; and initiate switching of the one secondary communication path back to the one communication path, switching of the one secondary communication path or the one communication path back to the another one communication path, or a combination thereof based on an expiration of the switch-back timer.

12. An apparatus according to claim 9, wherein the apparatus is further caused to:

set the latency threshold based on data traffic over the transmission network.

13. An apparatus according to claim 12, wherein the apparatus is further caused to:

determine a low-level latency threshold and a high-level latency threshold based on the data traffic over the transmission network, wherein the latency threshold is dynamically set based on the low-level latency threshold and the high-level latency threshold.

14. An apparatus according to claim 9, wherein the apparatus is further caused to:

initiate generation of one or more ping messages for transmission to one or more nodes of the communication paths according to a predetermined schedule; and determine that the failed-attempts threshold number has been reached during the predetermined period based on the ping messages.

15. An apparatus according to claim 9, wherein the communication paths include one or more label-switched paths, and the label-switched paths include a plurality of label edge routers, a plurality of label switch routers, or a combination thereof associated with a multi-protocol labeling switch standard.

16. A system comprising:

one or more processors configured to execute a latency manager, wherein the latency manager is configured to initiate measurement of latency associated with one or more communication paths of a transmission network, to detect an increase in the latency within the transmission network based on the latency measurement, to determine one or more secondary communication paths of the transmission network to address the latency increase, to select one of the secondary communication paths according to a latency threshold, and determine a threshold number of failed attempts to satisfy the latency threshold during a predefined period, wherein the detection of the latency increase is further based on a determination that the failed-attempts threshold number has been reached during the predefined period.

17. A system according to claim 16, wherein one of the communication paths is associated with the latency increase, and the latency manager is further configured to:

initiate switching of the one communication path to the one secondary communication path based on the detection of the latency increase;

determine a switch-back timer associated with the switching of the one communication path to the one secondary communication path, switching of another one of the communication paths to the one communication path, or a combination thereof; and initiate switching of the one secondary communication path back to the one communication path, switching of the one secondary communication path or the one communication path back to the another one communication path, or a combination thereof based on an expiration of the switch-back timer.

18. A system according to claim 16, wherein the latency manager is further configured to:

determine a low-level latency threshold and a high-level latency threshold based on the data traffic over the transmission network, wherein the latency threshold is dynamically set based on the low-level threshold and high-level threshold.

19. A system according to claim 18, wherein the latency manager is further configured to:

initiate generation of one or more ping messages for transmission to one or more nodes of the communication paths according to a predetermined schedule; and determine that the failed-attempts threshold number has been reached during the predetermined period based on the ping messages.

* * * * *